Feb. 28, 1950

R. D. APPERSON
APPARATUS FOR HANDLING THE
SHIPMENT OF GOODS IN BULK 2,498,906

Filed March 14, 1947

INVENTOR.
Richard D. Apperson
BY
Mann, Liddy, Flaccum & Rich
Attys

Feb. 28, 1950

R. D. APPERSON 2,498,906

APPARATUS FOR HANDLING THE
SHIPMENT OF GOODS IN BULK

Filed March 14, 1947

INVENTOR.
Richard D. Apperson
BY
Munn, Liddy, Glaccum & Rich
attys.

Feb. 28, 1950 R. D. APPERSON 2,498,906
APPARATUS FOR HANDLING THE
SHIPMENT OF GOODS IN BULK
Filed March 14, 1947 3 Sheets-Sheet 3
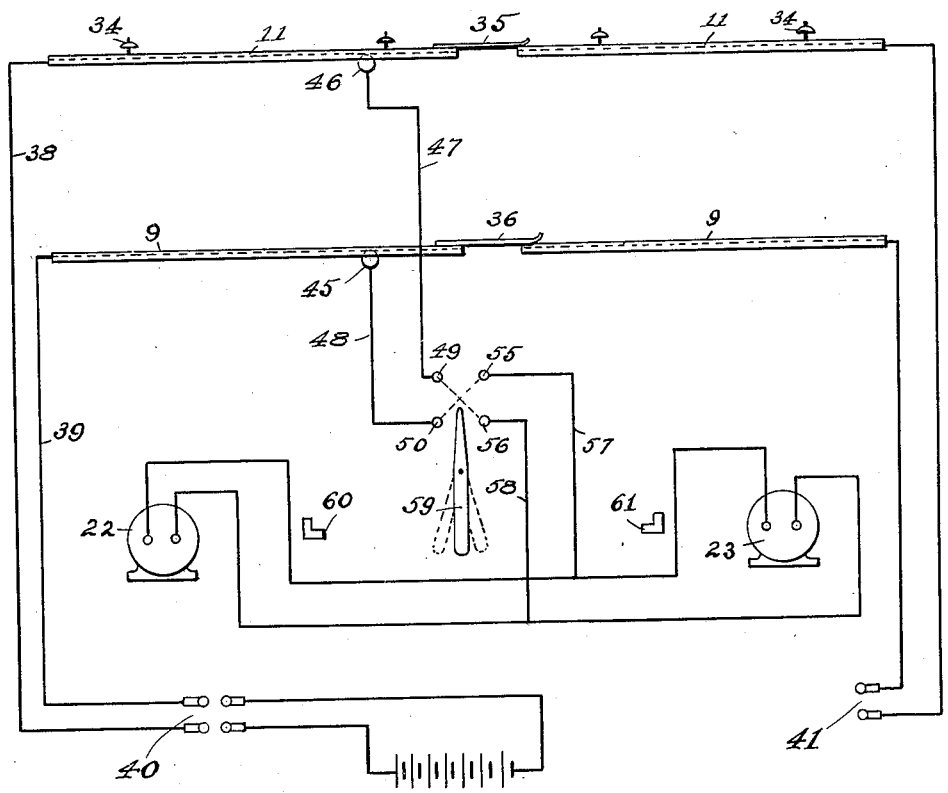
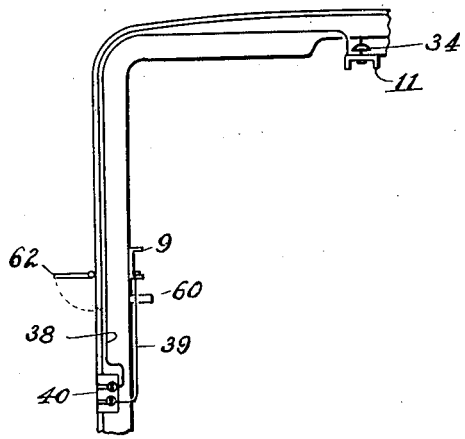

Patented Feb. 28, 1950

2,498,906

UNITED STATES PATENT OFFICE 2,498,906

APPARATUS FOR HANDLING THE SHIPMENT OF GOODS IN BULK

Richard D. Apperson, Lynchburg, Va.

Application March 14, 1947, Serial No. 734,793

6 Claims. (Cl. 214—38)

My present invention has for its object to provide an improved method in the handling of bulk shipments of goods for their transportation by air and generally comprises a goods container and especial features of construction of ground trucks and cargo airplanes whereby the loaded container may be readily transferred from one vehicle to the other.

To this end my invention further comprehends an airplane and a goods transportation van having complementary cubical capacities and a unitary chamber fitting therein, together with means for rapidly transferring the chamber from one vehicle to the other and also securing it firmly in place during the movement of either vehicle.

Another object of my invention is to provide the aforementioned vehicles and chamber with special equipment whereby the chamber may be readily transferred from the van to the airplane and vice versa when the two vehicles are brought into juxtaposed alinement.

To these and other ends my invention has for its object to provide further improvements in construction, all as will be fully described in the accompanying specification, the novel features thereof being set forth in the appended claims.

In the drawings:

Figure 5 is a transverse fragmentary vertical sectional view showing the manner in which the power rails are arranged in both vehicles.

Figure 6 is a schematic circuit diagram for the motors of the container showing the reversing switch.

Similar reference characters in the several figures indicate similar parts.

Figure 1:
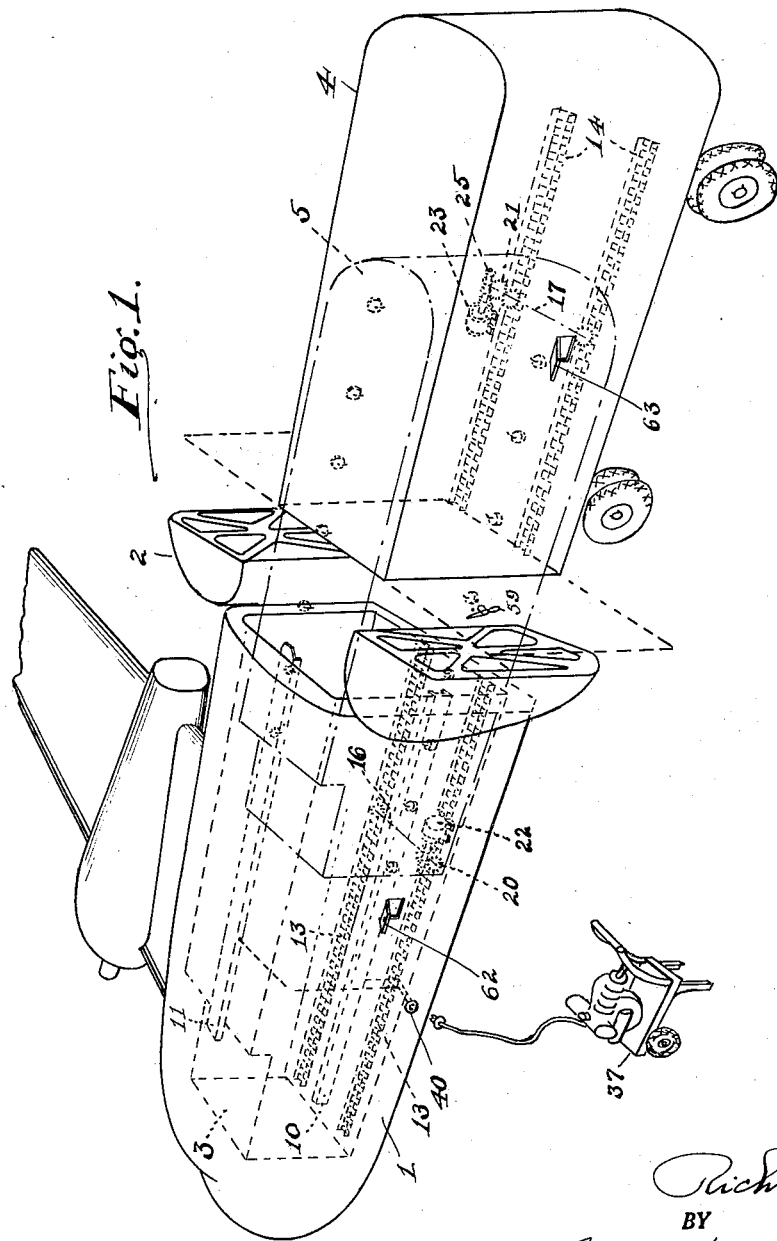
Figure 1 is a perspective view of a cargo airplane and van showing a goods container being transferred from one of these vehicles to the other, the arrangement of these parts being illustrative of the components comprising my invention.

The fuselage of cargo carrying airplanes is constructed to provide a maximum unobstructed interior space or chamber for receiving the goods to be shipped which may be packed in cartons, boxes or crates and for purposes of illustrating my invention I have shown an airplane comprising a body 1 having a rear end provided with doors 2 capable of being swung outwardly to expose the full width and height of the chamber. At the forward end of the fuselage the pilot's cockpit is elevated as indicated by the platform 3 (shown in dotted lines) giving added length to the chamber with but slight diminution in its height.

In conjunction with such an airplane my invention comprehends the use of a van or dray having a body 4 of dimensions equal to those of the cargo chamber of the plane which is adapted to be backed up in horizontal alinement with the open end of the plane fuselage 1. The container or capsule 5 is designed to fit alternately within the bodies of the two vehicles and to receive the goods to be transported which can be packed solidly therein and anchored against displacement. Means are provided for readily and quickly shifting the goods container from one vehicle to the other at an air field and for moving the container into and out of the van thus permitting it to be loaded and unloaded at a point most convenient to the warehouses of both shipper and consignee.

Figure 2:
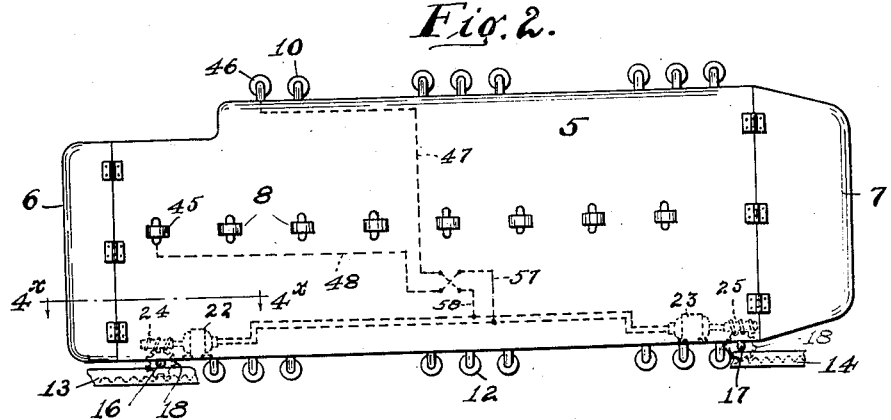
Figure 2 is a side elevation of a load carrying container or capsule.
Figure 3:
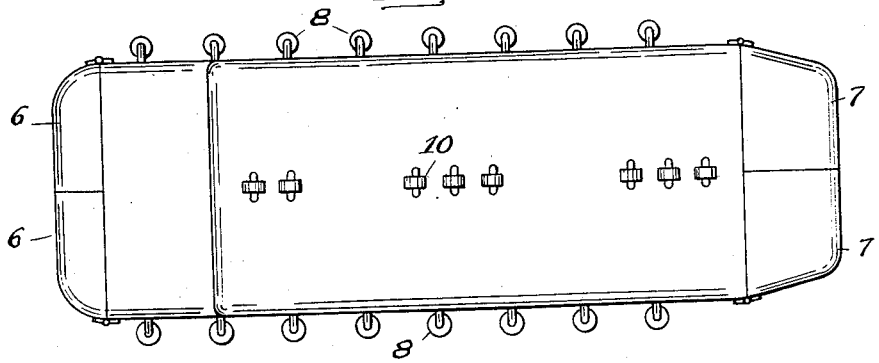
Figure 3 is a top plan view of the container.
Figure 4:
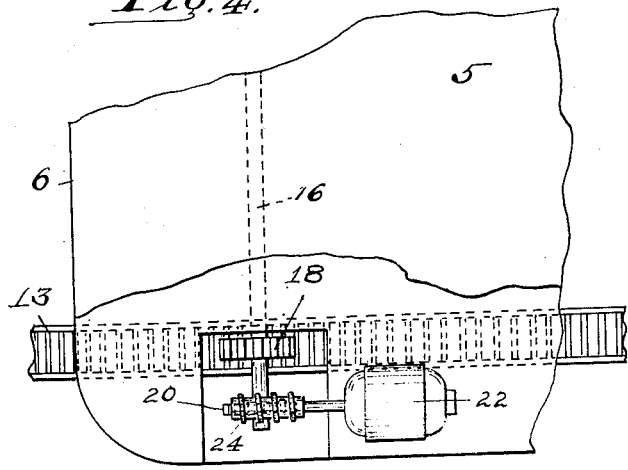
Figure 4 is a horizontal sectional view taken on the line 4x—4x of Fig. 2, showing one of the motors and its driving connection with one of the pairs of drive gears for bodily shifting the container.

In carrying out my invention I provide the goods container 5 of a size conveniently fitting within the cargo compartment of the airplane provided with pairs of doors or closures 6—6 and 7—7 preferably located at its opposite ends, as illustrated in Figs. 2 and 3. The container is centered laterally in each of the two vehicles by providing on each of its sides a plurality of small rollers 8 which engage within channelled tracks 9, shown in dotted lines in Fig. 1, on the inner sides of the fuselage 1. Also along the top of the container 5 are a series of similar spaced rollers 10 which cooperate with a track 11 on the underside of the roof portion of the fuselage. Cooperating with the aforementioned rollers to stabilize the container I provide along the center line of the bottom thereof sets of rollers as indicated at 12 which roll upon the floors of the vehicles.

On the flooring of the fuselage chamber I arrange spaced parallel tracks 13 and on the floor of the van I secure a pair of tracks 14 which are equally spaced so that the two sets of tracks will be in alinement when the van is backed into alinement with the airplane fuselage. These tracks are constructed as gear racks, the teeth thereon being of suitable pitch dimensions to receive the pinions carried on the underside of the conveyor which serve the triple purpose of supporting the conveyor, locking it in adjusted position in either vehicle and facilitating its movement from one vehicle to the other.

In practice I provide near the ends of the container 5 transversely extending shafts 16—17 journaled in suitable bearings and each carrying a pair of gears or pinions 18 engaging with the rack teeth on the underlying rails. At one of their ends these shafts are provided with worm gears 20—21 the upper edges of which extend within the container adjacent to electric motors 22—23, the armature shafts of which have spiral worms 24—25 which intermesh respectively with the worm gears 20—21. This arrangement permits the motors to be located at the corners of the container where they least interfere with the packing of goods therein. The horsepower rating of the motors is such that either of them will move the weight of the loaded container 5 and it will be observed from Fig. 1 that in certain positions when it is being transferred from one vehicle to the other that one or the other of the pairs of drive gears will be disengaged from the rack gears. This is necessarily due to the fact that it is impracticable to attempt to back the van into such close engagement with the open end of the airplane fuselage as to eliminate interruption in the pitch of the gear teeth of the two sets of gear racks. Then too the open position occupied by the doors 2 on the fuselage and the doors on the rear end of the van body, in the present day construction of these structures necessarily creates a considerable space between them when the van is alined with the open end of the plane fuselage. This opening may be bridged either by using skid planks or a heavy metal sheet for receiving the bottom rollers 12, and/or, if desired, short lengths of rack rails may be employed to span the space between the ends of the pairs of rack rails, as will be understood.

The motors 22—23 are synchronized in a common circuit having a reversible switch mechanism which is automatically disconnected when the container reaches the limit of its movement in either direction and is connected in the circuit in such a manner that at the extremes of travel of the container it may be manually operated to energize the motors to move the container in the proper direction to discharge it from the vehicle in which it is then located.

To the above ends I utilize the rails 9 on one of the inner sides of the vehicle and the rails 11 on the undersides of their roofs as contact rails. Rail 11 is supported on insulators 34. When the vehicles are alined the respective pairs of rails are connected in circuit with each other by contact bars 35 and 36 (see Fig. 6). Current is supplied to said rails at an air port by a portable battery cart, or generator, as indicated by 37 in Fig. 1, the circuit leads from which plug into jack terminals of conductors 38—39 conveniently located in the side of the fuselage 1, as indicated at 40 in Fig. 1. A similar connection may be provided on the van 4, as indicated at 41, for use in loading and unloading the container with reference to the van, at a warehouse destination.

Current for energizing the motors 22—23 is taken from the rails 9 and 11 by suitable contacts for which purposes one of the side rollers 8 and one of the top guide rollers 10 may each be employed as contact members for the side and top rails, as indicated by 45 and 46 in Figs. 2 and 6. The conductors 47 and 48 leading from the aforesaid contacts are connected to terminals 49—50 on a reversing switch comprising other terminals 55—56 for the conductors 57—58 connected to motors 22—23 and a movable arm 59. The latter when shifted in one direction on its pivot serves to connect one set of terminals for flow of current to the motors in one direction and when shifted in the other direction acts to change the polarity of the current to the motors. In its neutral position the arm 59 opens the circuits of both motors.

On the interior of the fuselage there is a stop 60 with which the switch member 59 engages when the container reaches the full extent of its inward movement. Likewise on the van 4 there is located a similar stop 61 for arresting the inward movement of the container therein, said stops and switch arm being indicated diagrammatically in Fig. 6. For the purpose of rendering the switch arm 59 accessible for manual manipulation I locate adjacent said stops in each vehicle hand holes, as shown, which are normally closed by hinged flaps 62—63.

I claim:

1. The combination with an airplane having a fuselage forming a cargo carrying chamber having an open end, and a goods van having a body at least equal in size to that of the chamber also having an open rear end, the van being capable of adjustment to bring it into alinement with the open end of the airplane, of a container of a size to fit within either the van or cargo chamber, gear racks secured within the fuselage and van, gear wheels journaled on the container adjacent its ends and engaging said racks and separate motors on the container for driving said gears.

2. The combination with an airplane having a fuselage forming a cargo carrying chamber having an open end, gear racks on the bottom of the chamber, and a goods container fitting within the chamber having spaced rollers on its sides, top and bottom cooperating with the interior surfaces of the chamber to center the container therein, of gears journaled on the bottom of the container adjacent its ends and engaging the gear racks, separate motors on the container for rotating said gears synchronously, a goods van for transporting the container and gear racks carried thereon also adapted for cooperation with the aforesaid gears when the van is positioned to aline them with the first mentioned gear racks.

3. The combination with an airplane fuselage and a van body of equal cubical capacity each having an open end and maneuverable to position said ends in alined juxtaposition, and a goods container of a size adapted to fit within either said fuselage or van body, of sets of drive wheels supporting the container at its opposite ends, a separate motor for rotating each set of wheels, a source of current, a motor circuit comprising contact rails mounted in the fuselage and van body, and contacts engaging therewith carried by the container, and a switch in said circuit for controlling the direction of current flow to the motors for alternately moving the container in opposite directions.

4. The combination with an airplane fuselage and a van body of equal cubical capacity each having an open end and maneuverable to position said ends in alined juxtaposition, and a goods container of a size adapted to fit within either said fuselage or van body, of sets of drive wheels supporting the container at its opposite ends, a reversible motor on the container, drive connections between it and said sets of wheels, a source of current, a motor circuit leading therefrom comprising contact rails on the fuselage and van body and contacts on the container adapted to engage the rails, a current reversing switch in said circuit comprising contacts and a shiftable arm cooperating therewith, and fixed stops on the fuselage and van body cooperating with said member to open the circuit at the limit of movement of the container within the fuselage and van body.

5. The combination with an airplane fuselage and a van body of equal cubical capacity each having an open end and maneuverable to position said ends in alined juxtaposition, and a goods container of a size adapted to fit within either said fuselage or van body, of gear racks extending longitudinally on the floors of the fuselage and van body, sets of gears engaging the racks and supporting opposite ends of the container, separate reversible motors mounted in the containers and in driving connection with the respective sets of gears, a source of current, a motor circuit comprising contact rails within the fuselage and van body and contact members on the container engaging the rails, and a reversing switch in said circuit having contacts and a manually operable shiftable member cooperating therewith to control the direction of current flow to the motors and the consequent propulsion of the container forward and backward, and fixed stops on the fuselage and van body cooperating with said member to move it into neutral position to disrupt the circuit as the container approaches the limit of its movement in either direction.

6. The combination with an open ended airplane fuselage, an open ended van body, a goods container movable from one of said parts to the other and gear racks fixed in the fuselage and van, of shafts journaled beneath the opposite ends of the container, gears fixed to the shafts in mesh with said racks, worm gears carried on said shafts, motors located in the corners of the container having armatures provided with worms engaging the worm gears, a common circuit for the motors carried by the container having contact members exterior of the container, contact rails on the interior of the fuselage and van body cooperating with said contact members, conductors extending from the rails and terminating in contact jacks accessible from the exteriors of the fuselage and van body and a source of current for connection to said jacks.

RICHARD D. APPERSON.

REFERENCES CITED

The following references are of record in the file of this patent:

UNITED STATES PATENTS

| Number | Name | Date |
| --- | --- | --- |
| 862,080 | Levin | July 30, 1907 |
| 1,288,175 | Pittman | Dec. 17, 1918 |
| 1,479,767 | Wolf | Jan. 1, 1924 |
| 1,667,023 | Baxter | Apr. 24, 1928 |
| 1,835,133 | Bergen | Dec. 8, 1931 |
| 1,942,022 | Faries | Jan. 2, 1934 |
| 2,367,538 | Sullivan | Jan. 16, 1945 |
| 2,405,833 | Johnston | Aug. 13, 1946 |
| 2,441,913 | Taylor | May 18, 1948 |